United States Patent [19]

Pittinger, Jr.

[11] 4,189,830

[45] Feb. 26, 1980

[54] SELF-THREADING FILAMENT TRIMMER SYSTEM

[76] Inventor: Charles B. Pittinger, Jr., 320 Cockeys Mill Rd., Reisterstown, Md. 21136

[21] Appl. No.: 919,052

[22] Filed: Jun. 26, 1978

Related U.S. Application Data

[63] Continuation-in-part of Ser. No. 713,147, Aug. 10, 1976.

[51] Int. Cl.² .................. A01D 35/26; A01G 3/06
[52] U.S. Cl. .................................. 30/276; 56/12.7
[58] Field of Search .................. 30/276, 347; 56/12.7, 56/295

[56] References Cited

U.S. PATENT DOCUMENTS 3,664,102  5/1972  Reber .................................. 56/295

*Primary Examiner*—Jimmy C. Peters
*Attorney, Agent, or Firm*—John F. McClellan, Sr.

[57] ABSTRACT

A self-threading housing for vegetation filament trimmers of the type having a supply within and movable relative to a housing to feed filament through an opening in the housing, for extension as a free end of filament swung in orbit as a cutting length of filament, by the filament trimmer. For self-threading of the filament free end there is provided, in the housing inner surface, structure inclined for engaging the free end under centrifugal force acting on the free end and shunting the free end through the opening, the incline including vertical incline and the opening being a slot; both bulge and recess housing wall structure are disclosed at the incline in different embodiments.

8 Claims, 5 Drawing Figures

EXEMPLARY ART

EXEMPLARY ART

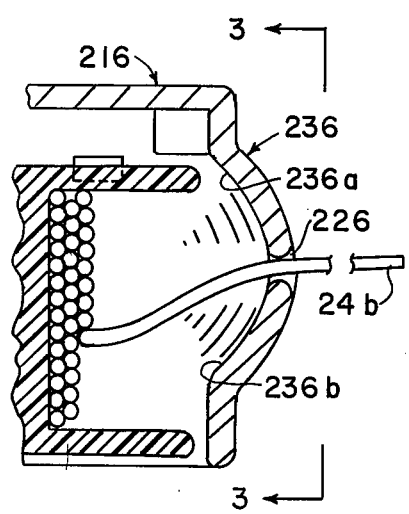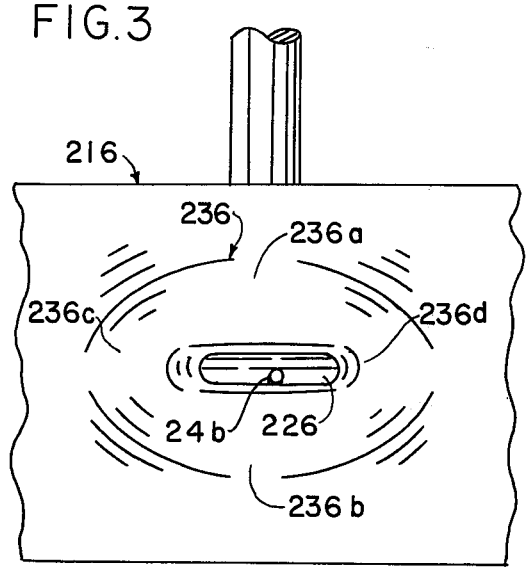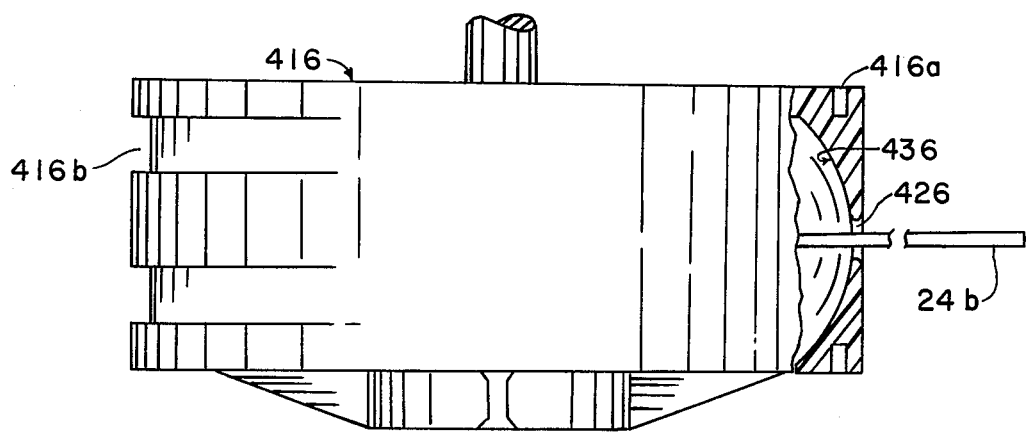

SELF-THREADING FILAMENT TRIMMER SYSTEM

This application is a continuation-in-part of my co-pending U.S. Patent Application Ser. No. 713,147, filed 8-10-76 for BUMP-FEED FILAMENT VEGETATION TRIMMER MEANS AND METHOD, which is still pending.

This invention relates generally to vegetation filament trimmers and specifically to filament deploying in such filament trimmers.

My above referenced Application Ser. No. 713,147 discloses an illustrative semi-automatic running feed for filament trimmers. A problem can occur in such housing-equipped filament trimmers employing for feeding of filament during operation a spool or other means feeding a length through an opening in the housing peripheral wall to serve as a free length of filament swung in an orbit as a cutting length by a filament trimmer. The filament may start within the housing, or may break-off short within the housing as result of stress during operation. In this case relative rotation between spool and housing or other feed mechanism upon demand for fresh filament may feed the filament but not through the housing aperture. Consequent tangle of the filament captive inside the housing wall may result, and in any case the filament trimmer must be stopped and the filament manually retrieved and fed through the housing aperture, defeating the advantage of semi-automatic or other running-feed provisions.

A principal object of the present invention is to provide a while-running, self-threading system for filament trimmers with peripheral-wall apertures.

Other advantages are to provide a system as described which requires no additional moving parts, which is as durable as the housing in which incorporated, which is fast, effective and adds very little if any to the cost of the filament trimmer in which incorporated, which is adaptable to a wide variety of sizes and models of filament trimmers, which helps prevent filament damage, which can save factory assembly time for filament trimmers, which simplifies operation of filament trimmers in which incorporated, and which is safe to use and pleasing in appearance.

In brief summary given for purposes of cursive description only and not as limitation, the invention includes a filament trimmer rotary housing having incline structure shunting filament through incline-cooperative aperture structure under centrifugal force.

The above and other objects and advantages of the invention will become more readily apparent on examination of the following description including the drawings in which like reference numerals refer to like parts:

FIG. 1b is a view taken from 1b—1b, FIG. 1a;

FIG. 2 is a side elevational detail showing an embodiment of this invention;

FIG. 3 is a view adapted from 3—3, FIG. 2; and

FIG. 4 is a side elevational view partly in section of a further embodiment.

PREVIOUSLY DISCLOSED ART ILLUSTRATIVE OF THE PROBLEM

Figure 1A:
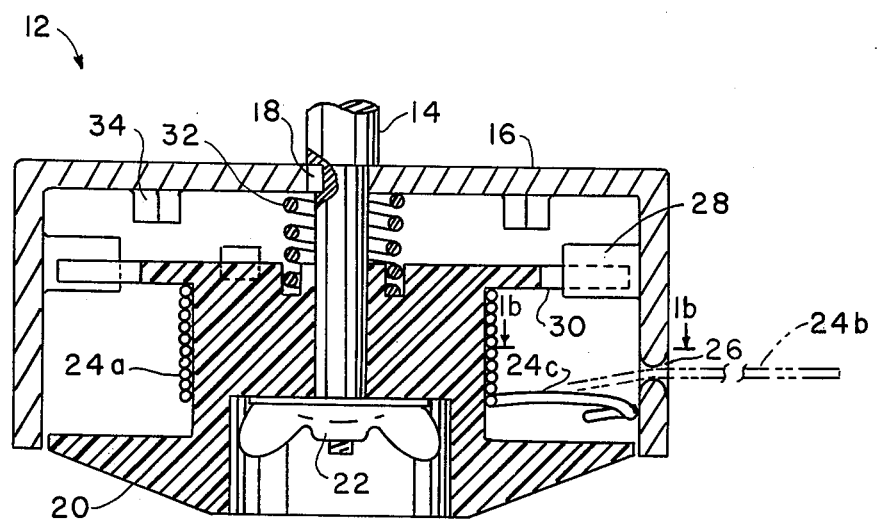
FIG. 1a is a side elevational view in partial section illustrating the problem.

FIG. 1a shows a filament trimmer head 12 having rotating shaft 14 to which housing 16 is affixed as by a key 18, and within the housing a spool 20 is retained at the lower end of the shaft by a nut 22.

Wound on the spool is a supply of filament 24a with a free end 24b of filament for extending outwardly (phantom lines) through an opening 26 in the housing. The filament free end is swung by the filament trimmer head, when rotated, as a cutting end.

Rotation of the spool on the shaft is prevented by engagement of housing stops 28 with tab portions 30 of the spool.

To feed additional filament from the spool through the aperture without stopping rotation of the filament trimmer the spool is slid upward on the shaft, as by bumping the lower end of the spool on the ground, against the bias of spring 32 to a position freeing the spool from the stops. At this position centrifugal pull on the line and/or ground contact causes the spool to rotate on the shaft relative to the housing in a direction feeding out filament and through an arc limited by housing lugs 34 which limit rotation of the spool. The spool then biases down and re-engages the stops.

However, as indicated, the free end may at the start, as upon supply replenishment, or upon break-off inside the housing under operating stress, or upon snap-back into the housing and out of coincidence with the aperture 26, as at 24c, require stopping the unit and manual refeeding, which can be dangerous because of mechanical hazards, and because of botanical hazards such as poison oak sap on the filament and housing.

Figure 1B:
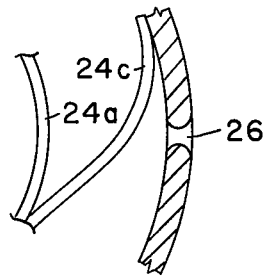

FIG. 1b indicates a plan view relation of filament bight 24c and aperture 26 which also can keep the filament from feeding. Thus the filament can be out of alignment in elevation and can when unwound present broadside a bight 24c which will resist feeding through an eyelet-type hole. It will be appreciated that the problem is similar regardless of whether the housing is arranged to rise relative to the spool or equivalent source to feed line or simply to rotate relative to the spool or equivalent source.

EMBODIMENTS OF THE INVENTION

FIG. 2 and FIG. 3 are respectively side elevational sectional detail and elevational detail of any housing 216 of the types described above but having an outwardly preferably elliptical convex bulge 236 around the filament aperture, which aperture may be a circumferential, sectionally all-rounded contour slot 226. Centrifugal force will tend to funnel a filament free end 24b, which is for any reason inside the housing, into the slot upon feed of a filament increment, the filament sweeping around and lodging in rotation at the longest radius of the recess, where it finds and passes through the aperture.

Vertical incline as at 236a, 236b of the sides of the bulge may extend beyond the aperture area to any distance within the limits of the housing perimeter and should be sufficient in extent to shunt the filament regardless of from what point on the vertical extent of the means for supplying filament, as from the spool, the filament is fed, or tends outwardly. To average out, the slot may be centered on the vertical incline structure.

Horizontal incline as at 236c, 236d (FIG. 3 only) may also extend around to any distance beyond the slot area within the limits of the housing perimeter; because of the slot horizontal orientation it may be greater than the vertical incline structure extent. To permit operation equally in either direction of housing rotation, other things being equal, the peripheral or horizontal extent of the horizontal incline structure may be centered on the slot.

Incline angle in either case can be at as great an angle relative to the nominally cylindrical contour of the wall as may be desired (about 30° being indicated) and at a minimum should be sufficient for positive shunting in view of the proportions and rotational speeds employed in particular embodiments, as will be directly ascertainable in an easy manner in the light of this invention. It is evident that the incline may be straight rather than curved, in either case, and height of the aperture may be other than centered on the spool, or the housing wall.

Height of the slot may be, as shown, sufficient for free passage of the filament and circumferential extent sufficient for a given filament size and stiffness to cause the free end to migrate out freely, about ten line diameters being shown for example. Preferably the length should be sufficient for a bight of the filament in the stiffness chosen to bend and pass out under centrifugal force of the rotational speed of the application, again easily ascertainable following the invention to suit the particular conditions chosen.

FIG. 4 shows an embodiment in which incline structure 436 adjacent aperture 426 is within the wall thickness of housing 416 which has a uniform outer periphery concentric with the drive shaft axis for smoother operation in trimming around obstacles such as posts. The vertical incline structure and the horizontal incline structure thus form a recess in the inner surface of the peripheral wall of the housing.

Counterbalances 416a may be employed to compensate for differing wall thicknesses and moments, or material may be removed from thicker sides, as on outer portions 416b, for the same purpose. In this view the aperture may be considered circular but preferably is a slot as before.

In conclusion, the advantage of maintaining a uniform cutting height by a vertically narrow yet freely self-threading aperture will be evident.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a housing for use with a filament trimmer having means for supplying filament to a free end thereof to be threaded outwardly from within the housing through an aperture in a peripheral housing wall and orbited as a cutting end by rotation of the housing on operation of the filament trimmer, the improvement comprising: the aperture being in an extreme outward portion of the peripheral housing wall, and self-threading means for threading said free end through the aperture under centrifugal force on the filament upon said rotation, including vertical-incline structure leading outwardly along the inner surface of said peripheral housing wall to the aperture, and horizontal incline structure leading outwardly along the inner surface of said peripheral housing wall to the aperture.

2. In a housing as recited in claim 1, the horizontal incline structure having greater extent than said vertical incline structure.

3. In a housing as recited in claim 2, the vertical incline structure and the horizontal incline structure together forming an elliptical shape.

4. In a housing as recited in claim 1, means adapting the housing for self-threading in either direction of said rotation comprising the horizontal incline structure centered on the aperture.

5. In a housing as recited in claim 1, the vertical incline structure and the horizontal incline structure forming a bulge in the peripheral housing wall.

6. In a housing as recited in claim 5, the bulge centered on the aperture.

7. In a housing as recited in claim 1, the peripheral housing wall being circular and the vertical incline structure and the horizontal incline structure forming a recess in the inner surface thereof.

8. In a housing as recited in claim 7, the recess centered on the aperture.

* * * * *